W. E. MERRITT.
ROTARY VALVE.
APPLICATION FILED APR. 26, 1915.
1,169,668.
Patented Jan. 25, 1916.
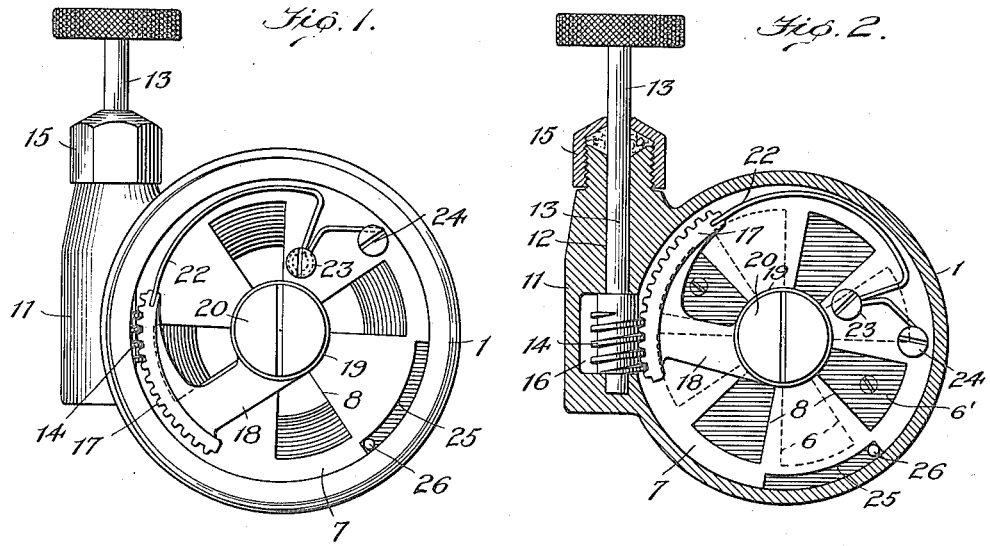
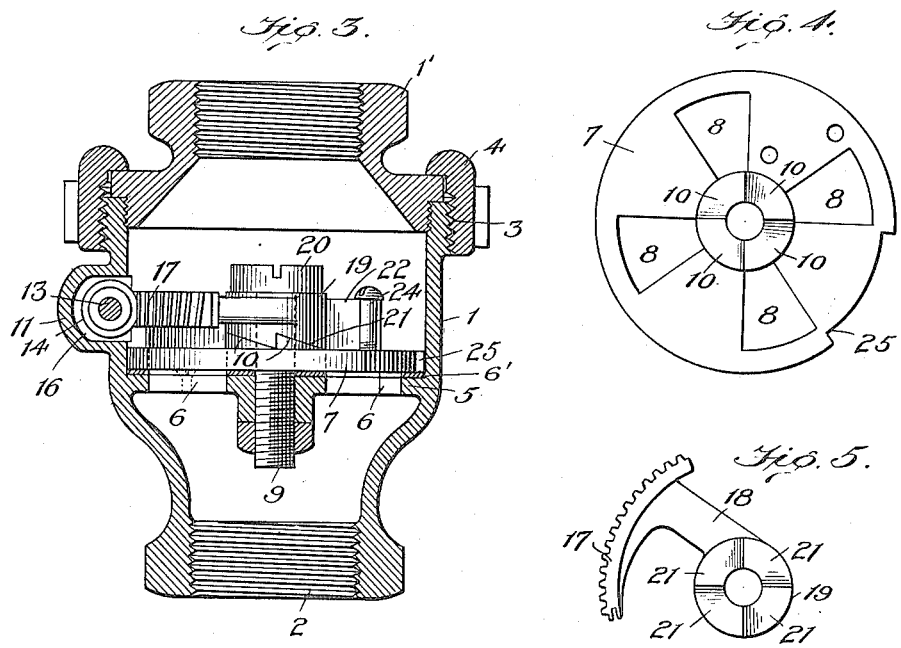
Witnesses
Edwin L. Bradford
M. D. Ballauf
Inventor
Wm. E. Merritt
By Wm. E. Dyre,
Attorney

UNITED STATES PATENT OFFICE.

WILLIAM E. MERRITT, OF PORTLAND, OREGON, ASSIGNOR OF ONE-HALF TO JOSEPH L. HOFFMAN, OF PORTLAND, OREGON.

ROTARY VALVE.

1,169,668. Specification of Letters Patent. Patented Jan. 25, 1916.

Application filed April 26, 1915. Serial No. 24,069.

*To all whom it may concern:*

Be it known that I, WILLIAM E. MERRITT, a citizen of the United States, residing at Portland, in the county of Multnomah and State of Oregon, have invented certain new and useful Improvements in Rotary Valves; and I do hereby declare the following to be a full, clear, and exact description of the invention, such as will enable others skilled in the art to which it appertains to make and use the same.

My present invention relates to throttle or stop valves for regulating the flow of water, steam, or other fluids, and has for an object the production of rotary disk valves which are at once extremely simple in construction and peculiarly efficient in their operation.

A further object is the production of valves of the class mentioned, wherein the packing ordinarily interposed between valve and valve seat is dispensed with.

A further object is the production of novel means for automatically forcing the valve, when closed, into close contact with its seat.

Other objects and advantages of the structure herein shown and described will be apparent to persons skilled in the art to which these improvements relate, and the invention will be hereinafter particularly described and pointed out in the claims following.

In the accompanying drawings which form part of this application for Letters Patent, and whereon corresponding numerals refer to like parts in the several views: Figure 1 is a plan view of the invention with union removed disclosing the rotary valve member. Fig. 2 is a transverse section through valve case, also showing the valve disk and stem for rotating it. Fig. 3 is a central longitudinal section through valve case taken at right angles to Fig. 2. Fig. 4 is a top plan view of the rotary disk valve detached, and Fig. 5 is an inverted plan view of a valve lever and actuating segment also detached.

Reference being had to the drawings and numerals thereon, 1 represents a cast valve case of substantially cylindrical form provided at opposite ends with screw connections 2 and 3 for the reception of a service pipe (not shown) and a coupling ring 4, respectively, the latter for attachment of an ordinary pipe union such as 1'. Interiorly the said case 1 is provided with an integral valve seat 5 ported as at 6, and protected by a renewable wear plate 6' similarly ported, and rigidly secured to seat 5 as a part thereof, by countersunk screws, as shown by Figs. 2 and 3. Surmounting this seat is a rotatable disk valve 7 also ported to correspond with ports 6 of the valve seat aforesaid, and pivotally mounted upon an axial bearing 9 projecting centrally from said valve seat. While upon the under surface of said valve 7, around the axial center thereof, is provided a plurality of cam faces 10.

Tangentially arranged with relation to the exterior surface of casing 1 is an integral projection 11 bored centrally as at 12 to receive a valve stem 13 provided with a worm 14 near its inner end. The projection 11 is provided with an ordinary stuffing box 15, and near its opposite end is an enlargement or chamber 16 communicating directly with the interior of casing 1 for containing said worm 14 which latter projects slightly into the casing, as best shown by Fig. 2 of the drawings.

Meshing constantly with the worm 14 is a segmental rack 17 forming part of a radial valve actuating lever 18 having an enlarged suitable boss 19 mounted upon and beneath screw head 20 of the central valve bearing 9 aforesaid. The under surface of said pivotal boss 19 is configured by a plurality of cam faces 21 mating with the faces 10 aforesaid upon the valve for the purpose of forcing the entire valve into close contact with its seat when closed, as will appear in a statement of operation hereinafter.

Connected rigidly to the tail of segmental rack 17, and projecting therefrom, is a leaf spring 22 which, following substantially the contour of the valve case, is pivotally mounted upon a screw pin 23 rising from the surface of the valve, this spring being prevented from turning upon the pin 23 by a stop pin 10( 24 also rising from the valve and engaging the free end of said spring, as shown by Figs. 1 and 2.

Cut into the periphery of disk valve 7 is an arcuate depression 25 extending almost the entire distance from one port 8 to the adjacent port 8, and within the path of this depression 25 is located a fixed pin or stop 26, serving to positively limit rotation of the valve 7 in both directions.

This being a description of my present invention, in the best form of construction now known to me, it should be understood that I do not consider myself restricted to the particular form and arrangement of parts hereinbefore shown and described by way of exemplification. On the contrary, various changes falling clearly within the scope of my invention will readily be suggested to persons skilled in the art to which it relates, but having reference to the embodiment above described the operation will now be briefly set forth as follows: Presuming the valve to be wide open as shown by Fig. 1, rotation of stem 13 now operating through worm 14, its intermeshing segmental rack 17, and the spring 22, causes valve 7 to rotate to the position shown by Fig. 2 for the purpose of closing its ports. It will be particularly noted, however, that rotation of the disk valve 7 as aforesaid, is effected by agency of the spring 22 interposed between rack 17 and a relatively fixed support 23, rather than by the lever 18 as might be supposed.

Upon reaching the closed position as shown by Fig. 2 of the drawings, valve 7 is arrested by stop pin 26 within slot 25 in the well understood manner, but it will be particularly noted that the flexibility of spring 22 permits further movement of the segmental rack 17, whereupon lever 18 serves to forcibly rotate the pivotal boss 19. Beneath this boss 19 its cam faces 21, bearing directly upon the opposing cam faces 10 of the valve disk, serve to automatically and positively force the valve 7 into more intimate contact with its seat 5, thereby most effectively preventing leakage through the closed valve.

In opening the valve 7 the operation last described is of course reversed, but it will be noted that spring 22 is first returned to its normal condition, as shown by Fig. 1, whereupon the interlocked edges of cams 10 and 21 engage to positively rotate valve 7 in the reverse direction to open it.

It will be also observed that the working face of valve seat 5 or wearplate 6' may be instantly removed when occasion requires by merely withdrawing the countersunk screws which secure it rigidly to imperforate parts of said seat 5. This wear plate 6' may then be replaced by a new one, or it may be rotated to a new position and there secured as before, in either event adding materially to the life and utility of valves thus equipped.

Having thus described my invention what I now claim and desire to secure by Letters Patent is:

1. In a valve mechanism the combination with a valve case and ported valve seat, of a ported rotary valve, means for rotating said valve to bring said ports into register, and oppositely disposed inclines interposed between said valve and its rotating means in alinement with the inlet and outlet through the openings in the ported valve seat and rotary valve, whereby the valve may be more effectually seated after closing.

2. In a valve mechanism the combination with a valve case and ported valve seat, of a correspondingly ported removable wear plate secured to said seat, means for rotating said valve to bring said ports into register, and oppositely disposed inclines interposed between said valve and its rotating means in alinement with the inlet and outlet through the openings of said ported valve seat and rotary valve, whereby the valve may be more effectually seated after closing.

3. In a valve mechanism the combination with a valve case a ported valve seat and a ported rotary valve, of means for rotating said valve including an actuating lever yieldingly connected with the valve, and oppositely disposed inclines interposed between said lever and valve in alinement with the inlet and outlet through the openings in the said ported valve seat and rotary valve, whereby the valve may be more effectually seated after closing.

4. In a valve mechanism the combination with a valve case a ported valve seat and a ported rotary valve, of means for rotating said valve including an actuating lever connected to said valve by a projecting leaf spring, and oppositely disposed inclines interposed between said lever and the surface of said valve whereby the latter may be forced into closer contact with its seat after closing.

5. In a valve mechanism the combination with a valve case a ported valve seat and a ported rotary disk valve, of means for rotating said valve including an actuating lever connected to said valve by a projecting leaf spring, and oppositely disposed inclines interposed between said lever and valve about the axial center thereof whereby the valve may be forced into closer contact with its seat by continued rotation after closing.

6. In a valve mechanism the combination with a valve case a ported valve seat and a correspondingly ported rotary valve, of means for rotating said valve including a valve stem provided with a driving worm, a segmental rack intermeshing with said worm, a yielding connection between said rack and rotary valve, an axially mounted actuating lever carrying said rack, and oppositely disposed inclines interposed between said lever and valve about the axial center thereof whereby the valve may be forced into closer contact with its seat by continual rotation after closing.

In testimony whereof I affix my signature, in presence of two subscribing witnesses.

WILLIAM E. MERRITT.

Witnesses:
 JOSEPH WOLFS,
 J. L. MEARS.